United States Patent [19]

Kawada et al.

[11] Patent Number: 4,492,457
[45] Date of Patent: Jan. 8, 1985

[54] COLOR CORRECTING DEVICE FOR COLOR PRINTING LIGHT SOURCE

[75] Inventors: Tetsuo Kawada, Matsudo; Yoshio Ozawa, Yokohama, both of Japan

[73] Assignee: Copal Company Limited, Tokyo, Japan

[21] Appl. No.: 383,837

[22] Filed: Jun. 1, 1982

[30] Foreign Application Priority Data

Jun. 4, 1981 [JP] Japan .................................. 56-86004

[51] Int. Cl.³ .............................................. G03B 27/80
[52] U.S. Cl. ......................................... 355/38; 355/88
[58] Field of Search ................................... 355/38, 68

[56] References Cited

U.S. PATENT DOCUMENTS 3,867,029  2/1975  Weinert ................................. 355/38
4,192,605  3/1980  Fergg et al. ........................... 355/38
4,408,873 10/1983  Labrum ............................. 355/38 X

*Primary Examiner*—Richard A. Wintercorn
*Attorney, Agent, or Firm*—Cushman, Darby & Cushman

[57] ABSTRACT

A color correcting device for a color printing light source comprising light receivers arranged so as to be able to receive a light from a light source having passed through light adjusting color filters and a servo-device which compares an output from the light receiver with a reference value and can determine the amount of entrance into the light path of the light adjusting color filter by the compared output, whereby the color of the light source can be always properly corrected without re-adjusting the reference value in spite of the dirtying or deterioration of the light adjusting color filters and the replacement or deterioration of the light source lamp.

2 Claims, 1 Drawing Figure

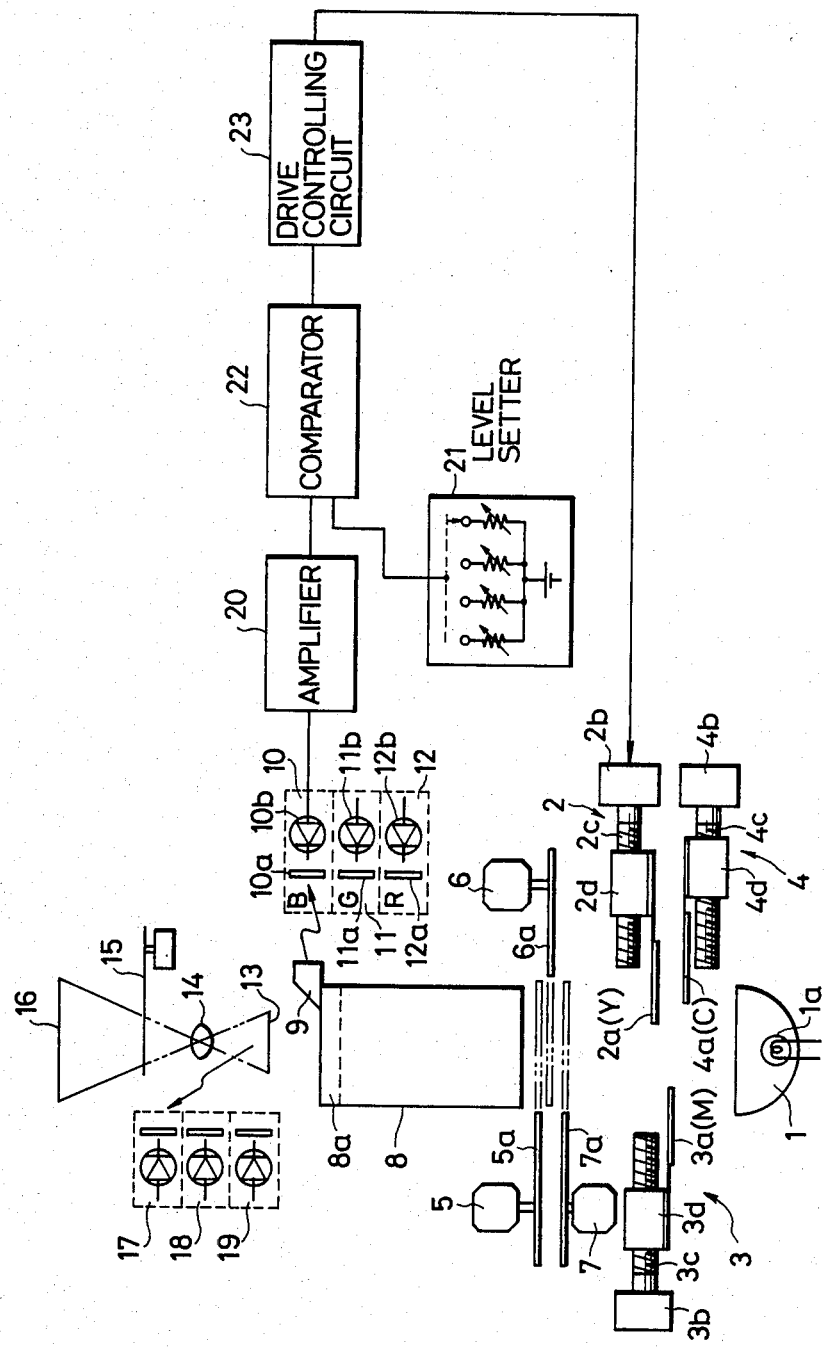

COLOR CORRECTING DEVICE FOR COLOR PRINTING LIGHT SOURCE

BACKGROUND OF THE INVENTION (a) Field of the Invention

This invention relates to a color correcting device for a light source in a color printer for printing color photographs from color films.

(b) Description of the Prior Art

Generally, in a color printer, a light projected out of a light source lamp is not used as an exposing light as it is but is corrected by light adjusting color filters so as to be adapted for printing. Usually, this correction is so made that the exposure time for each of the three original colors (primaries) may not be the same. This is to elevate the working efficiency. That is to say, in fact, this adjustment is made by determining the amounts of insertion of the respective color filters of Y, M and C into the exposure light path so that the exposures for the three original colors of blue, green and red may end simultaneously by using a standard color negative film (which is a negative film in which the numerical values of the respective color elements occupied in a photographed picture are most standard) (generally, making this adjustment is called "taking dead heat").

However, this adjustment must be re-made each time due to the alteration of the type of the negative film to be used and the enlarging magnification, replacement of the light source lamp to be used, the deterioration of the light source lamp in use and the dirtying or deterioration of the color filters in use.

A method wherein the amounts of insertion of the respective color filters corresponding to the variations of the type of the negative film and the enlarging magnification into the light path are memorized in advance and the respective color filters are inserted to the memorized corresponding positions each time of the variation of the negative film type or of the enlarging magnification is already adopted as an advanced method of remaking such adjustment. However, in such method, the dirtying or deterioration of the color filters and the variation of the color temperature of the lamp due to the replacement or deterioration of the lamp or to the delicate variation of the voltage can never be disposed and such factors must be re-adjusted after all.

SUMMARY OF THE INVENTION

A primary object of the present invention is to provide a color correcting device for a color printing light source wherein a proper color correction can be always automatically made without re-taking dead heat again not only against the variations of the kind of the negative film to be used and the enlarging mgnification but also against the dirtying or deterioration of the light adjusting color filters and the deterioration or replacement of the light source lamp.

According to the present invention, this object is attained by providing light receivers which can receive a light having passed through light adjusting color filters and a servo-device which compare outputs from the light receivers with set reference values and can determine the amounts of insertion of the light adjusting color filters into the light path by the compared outputs.

This and other objects of the present invention will become more apparent during the course of the following detailed description and appended claim.

BRIEF DESCRIPTION OF THE DRAWINGS

The drawing is an explanatory view showing a basic formation of an embodiment of a color correcting device for a color printing light source according to the present invention.

DESCRIPTION OF THE PREFERRED EMBODIMENT

In the drawing, the reference numeral 1 denotes a light source device having a light source lamp 1a and the reference numerals 2, 3 and 4 are driving devices set near the light source device 1 and for inserting into and retracting out of a light path respective light adjusting color filters 2a, 3a and 4a. As the driving devices 2, 3 and 4 are formed all the same, the formation of only the driving device 2 shall now be detailed. That is to say, the reference numeral 2b denotes a motor fixed to a printer body not illustrated, 2c denotes a screw bar connected to a rotary shaft of the motor 2b and 2d denotes a movable piece screwed to the screw bar 2c, regulated to be movable only in the longitudinal direction of the screw bar 2c and supporting a light adjusting Y (yellow) filter 2a. The movable piece 2d will move leftward to advance the Y filter 2a into the light path when the motor 2b is normally rotated but will move rightward to retract the Y filter 2a out of the light path when the motor is reversely rotated. Therefore, in the actual use, the motor 2b serves to adjust the amount of entrance of insertion of the Y filter 2a into the light path. As described above, the driving devices 3 and 4 are also formed the same. The driving device 3 serves to adjust the amount of entrance of an M (magenta) filter 3a into the light path with a motor 3b, screw bar 3c and movable piece 3d. The driving device 4 serves to adjust the amount of entrance of a C (cyanic) filter 4a into the light path with a motor 4b, screw bar 4c and movable piece 4d. The formation of this driving device is a mere example. Other various types can be conceived. The reference numerals 5, 6 and 7 denote known driving devices for inserting into and retracting out of the light path exposing color filters, that is, respectively a Y filter 5a, M filter 6a and C filter 7a. The reference numeral 8 denotes a mirror box having a diffusing plate 8a within and for mixing three original color lights, 9 denotes a light leading mirror set at the top of the mirror box 8 and for leading out sidewise a part of the lights mixed within the mirror box 8, 10, 11 and 12 denote light receivers including respectively a light adjusting B (blue) filter 10a and light receiving element 10b, a light adjusting G (green) filter 11a and light receiving element 11b and a light adjusting R (red) filter 12a and light receiving element 12 and for receiving the light led out of the light leading mirror 9. 13 denotes a color negative film to be printed, 14 denotes a lens, 15 denotes a shutter, 16 denotes printing paper, 17, 18 and 19 denote light receivers formed respectively the same as the light receivers 10, 11 and 12 in order to measure the light having passed through the negative film. 20 denotes an amplifier connected to the light receiving element 10b of the light receiver 10 and for amplifying the light current from the light receiving element 10b. 21 denotes a level setter containing a plurality of switchable resistors or microcomputers to set reference levels, 22 denotes a comparator for comparing the output from the amplifier 20 and the reference output from the level setter with each other and 23 denotes a drive controlling circuit for controlling the amount of insertion of the Y filter 2a into the light path by normally or reversely rotating the motor 2b of the driving device 2 by the size and polarity of the output from the comparator 22. The driving device 2, light receiver 10, amplifier 20, level setter 21, comparator 22 and drive controlling circuit 23 form a servo-system. The same servo-systems as are described above are formed respectively between the driving device 3 and light receiver 11 and between the driving device 4 and light receiver 12.

The operation of the above mentioned device shall be explained in the following.

First of all, the case of printing on the printing paper 16 by using the color negative film 13 shall be explained. In this case, the color condition of the light source has been already adjusted. That is to say, dead heat has been taken in advance by the respective light adjusting Y, M and C filters 2a, 3a and 4a. Therefore, the color negative film 13 is irradiated with the exposing Y, M and C filters 5a, 6a and 7a retracted out of the light path. In this state, when the shutter 15 is opened, the exposure on the printing paper 16 will be started and, at the same time, the measurement of the respective original color lights will be started by the light receivers 17, 18 and 19. Thus, when the light amounts of the respective original color lights reaching the printing paper become respectively proper values, the Y, M and C filters 5a, 6a and 7a will be inserted respectively into the light path by signals from the light receivers 17, 18 and 19 and at last the shutter 15 will close to complete one exposure.

Here, the color correction of the light source by the light adjusting color filters 2a, 3a and 4a shall be described. In the case of correcting colors, the exposing color filters 5a, 6a and 7a will have retracted out of the light path. Therefore, when the printing conditions (such as the type of the film, the kinds of the color filters and light source and the enlarging magnification) are determined and the color filters 2a, 3a and 4a are inserted into the light path from the light source lamp 1a for the standard negative film, the respective light receiving elements 10b, 11b and 12b will receive respective corresponding lights through the B, G and R filters 10a, 11a and 12a by the light leading mirror 9 set at the top of the mirror box 8.

First of all, the B (blue) color among them shall be described. When the output of the light receiving element 10b is amplified by the amplifier 20 and is put into one input terminal of the comparator 21, a reference level set by the setter 21 in advance and conforming to the present printing conditions will be put into the other input terminal, they will be compared in the comparator 22 and will be led into the driving circuit 23, the driving device 2 will be operated by this output and the Y filter 2a will be inserted to reduce the B color and, when the output from the driving circuit 23 becomes O, the operation of inserting the filter 2a will stop the above mentioned reference level is determined by means of a method well known by those skilled in the art on the basis of light passed through a standard negative film.

Further, also on the G (green) color and R (red) color of the light receivers 11 and 12, the same as in the case of the B color, according to the values set in the level setter, respectively the M and C filters 3a and 4a will be inserted and controlled.

Thus, while the light adjusting color filters 2a, 3a and 4a reducing the three colors of B, G and R can be freely inserted and controlled in the setter (in fact, as there is no ideal color filter, while the three colors slightly interfere with one another), when the set values (reference levels) under these printing conditions for the B, G and R colors are determined in the respective setters so that the exposure time of the three original colors for the standard negative film may be the same in conformity with the present printing conditions, the so-called dead heat will be able to be taken. If such set values are memorized under various printing conditions, in case a certain printing condition is given, the memorized value will be selected and it will not be necessary to take the dead heat again. While these servo-systems are working, the optimum dead heat will be constantly automatically taken but, in case the printing conditions are invariable for some time, the servo-system may be inoperative for the time and the light adjusting color filters may be kept stationary in fixed positions.

By the way, when two of the light adjusting Y, M and C filters 2a, 3a and 4a are inserted and controlled, the relative relation of the three original colors will be determined. Therefore, depending on the brightness of the light source, two filters may well be controlled. Further, the exposing light receivers 17, 18 and 19 can be used also for the light receivers 10a, 11a and 12a. In such case, with the negative 13 removed or with the standard negative put in the position of the negative 13, the dead heat will be able to be taken.

As mentioned above, according to the present invention, the position itself in which the dead heat of the light adjusting color filters is taken is not to be memorized but the light receivers 10, 11 and 12 are so set as to receive the light having passed through the light adjusting color filters 2a, 3a and 4a and the state itself of the light having taken the dead heat is to be memorized. Therefore, even against the dirtying or deterioration of the light adjusting color filters 2a, 3a and 4a or the deterioration or replacement of the light source lamp 1a, a proper color correction can be always made without re-taking the dead heat again.

We claim:

1. In a color correcting device for a printing light source in a color printer comprising light adjusting filters provided insertably in a light path of a light from said light source for adjusting the amount and the color temperature of the light from said light source so as to adapt the light from said light source for a printing exposing light, and exposing filters for determining an exposure amount of said printing exposing light on a negative film, an improvement comprises light receiving means arranged to receive a part of the printing light leading to a printing paper from the light source, driving means respectively connected to the light adjusting filters to insert said light adjusting filters into said light path, and servo-systems including therein said light receiving means and said driving means, the amounts of insertion of said light adjusting filters into said light path being adjusted through said servo-systems by comparing values obtained through said light receiving means by receiving said printing exposure light before passing through said negative film under the state in which said exposing filters are retracted out of the light path, with values obtained through said light receiving means by receiving said printing exposure light passed through a standard negative film set in the light path.

2. A color correcting device for a printing light source in a color printer according to claim 1, in which said light receiving means comprise a mirror box arranged between said light source and said negative film and light receivers adjacent to said mirror box.

* * * * *